UNITED STATES PATENT OFFICE.

CLARENCE E. R. BROWN, OF NOOKSACK, WASHINGTON, ASSIGNOR OF ONE-HALF TO GLENN A. CAMPBELL, OF NOOKSACK, WASHINGTON.

SHOE OR LEATHER DRESSING.

1,057,325.      Specification of Letters Patent.      Patented Mar. 25, 1913.

No Drawing.      Application filed March 12, 1912.      Serial No. 683,363.

*To all whom it may concern:*

Be it known that I, CLARENCE E. R. BROWN, a citizen of the United States, residing at Nooksack, in the county of Whatcom and State of Washington, have invented new and useful Improvements in Shoe or Leather Dressing, of which the following is a specification.

This invention relates to shoe or leather dressings, the object of the invention being to provide a water-proof dressing for black or tan leather which is inexpensive of production and adapted to be easily applied, and which will preserve and keep the leather soft and give an attractive and durable polish.

My improved shoe or leather dressing consists of the following ingredients, combined in or about the stated proportions, to wit: castor oil, 32 parts; linseed oil, 8 parts; neat's-foot oil, 16 parts; mutton tallow, 12 parts; resin (English), 5 or 6 parts; beeswax, 28 parts; rubber, 5 parts; and lampblack, ½ part.

In preparing the dressing, the tallow is placed in a vessel and melted, and to the melted tallow is then added the rubber, and the mixture is heated until the rubber is melted and combined with the tallow. The beeswax is then placed in a separate vessel and melted, after which the oils, lampblack and resin are successively added, the mixture being thoroughly stirred after the addition of each ingredient to thoroughly combine the same. This mixture is heated to the boiling point and after the resin is melted the heated composition of rubber and tallow are added. The composition as a whole is then maintained at the boiling point for a period of about one-half hour until the ingredients are thoroughly incorporated, then set to cool and stirred until it thickens to the desired consistency. A paste is thus produced which is packed in tins or other receptacles for use.

In the production of a dressing for tan leather, the lampblack is omitted and white rubber used in place of dark rubber, which may be employed in the dressing for black leather.

The paste is applied to the leather in any suitable manner and when subjected to friction will coat and fill the pores of the leather and take a high polish. It softens and preserves the leather to a remarkable degree, and may be applied with convenience and removed by simply washing the leather with hot water. The leather to which the dressing is applied is waterproof, highly flexible and will not crack or split. The dressing and polish are highly durable and remain practically unaffected by moisture at atmospheric temperature.

Having thus described the invention, what I claim as new is:—

A shoe or leather dressing comprising a composition of castor oil, linseed oil, neat's-foot oil, mutton tallow, resin, beeswax, rubber, and lampblack.

In testimony whereof I affix my signature in presence of two witnesses.

CLARENCE E. R. BROWN.

Witnesses:
    S. G. MATHER,
    M. MATHER.